US011131376B2

(12) United States Patent
Ott

(10) Patent No.: US 11,131,376 B2
(45) Date of Patent: Sep. 28, 2021

(54) MULTISECTION SPEED/TORQUE COMPENSATING ELECTRO-MECHANICAL ENERGY-CONVERSION DEVICE

(71) Applicant: Brian K Ott, Winber, PA (US)

(72) Inventor: Brian K Ott, Winber, PA (US)

( * ) Notice: Subject to any disclaimer, the term of this patent is extended or adjusted under 35 U.S.C. 154(b) by 0 days.

(21) Appl. No.: 16/350,024

(22) Filed: Sep. 14, 2018

(65) Prior Publication Data

US 2020/0088283 A1    Mar. 19, 2020

(51) Int. Cl.
| | | |
|---|---|---|
| *F16H 48/36* | (2012.01) | |
| *F16D 41/063* | (2006.01) | |
| *F16H 48/10* | (2012.01) | |
| *B60K 6/48* | (2007.10) | |
| *B60K 6/365* | (2007.10) | |
| *H02K 7/108* | (2006.01) | |
| *H02K 7/116* | (2006.01) | |
| *H02K 16/02* | (2006.01) | |
| *H02K 7/102* | (2006.01) | |
| *F16H 48/34* | (2012.01) | |

(52) U.S. Cl.
CPC .............. *F16H 48/36* (2013.01); *B60K 6/365* (2013.01); *B60K 6/48* (2013.01); *F16D 41/063* (2013.01); *F16H 48/10* (2013.01); *H02K 7/102* (2013.01); *H02K 7/108* (2013.01); *H02K 7/116* (2013.01); *H02K 16/025* (2013.01); *B60K 2006/4808* (2013.01); *B60K 2006/4816* (2013.01); *F16H 2048/343* (2013.01); *F16H 2048/364* (2013.01); *F16H 2200/2005* (2013.01); *F16H 2200/2082* (2013.01); *H02K 2201/15* (2013.01)

(58) Field of Classification Search
CPC .............. F16H 48/10; F16H 2048/343; F16H 2200/2005; F16H 2200/2082; F16H 48/36; B60K 6/365; B60K 2006/4808; B60K 2006/4816; B60K 2007/003; B60K 6/48; H02K 7/116; H02K 16/025; H02K 7/1823; H02K 7/183; H02K 16/00
USPC ........................................ 475/5, 8, 150, 297
See application file for complete search history.

(56) References Cited

U.S. PATENT DOCUMENTS

| | | | |
|---|---|---|---|
| 7,014,586 B2 | 3/2006 | Randall | |
| 2002/0063001 A1* | 5/2002 | Lennevi | B60K 6/365 180/65.235 |
| 2002/0091028 A1* | 7/2002 | Kashiwase | B60W 10/115 475/5 |
| 2008/0143286 A1* | 6/2008 | Egami | B60K 6/445 318/432 |
| 2009/0258280 A1* | 10/2009 | Ishikura | B60K 6/26 429/50 |
| 2010/0185349 A1* | 7/2010 | Harada | B60W 10/06 701/22 |

(Continued)

FOREIGN PATENT DOCUMENTS

CN    103296951    9/2013

*Primary Examiner* — Roger L Pang

(57) ABSTRACT

An electromechanical machine that uses electrical power to provide electromechanically-balanced motive torque to one or more mechanical loads, or that uses electromechanically-balanced mechanical power from one or more sources of motive torque to supply electrical power to one or more loads, while seamlessly reconciling the speed and torque differences between such loads-and-sources by use of speed-torque modules and a control means.

9 Claims, 12 Drawing Sheets

(56) References Cited

U.S. PATENT DOCUMENTS

| | | | |
|---|---|---|---|
| 2011/0220428 A1* | 9/2011 | Ando | B60K 6/365 |
| | | | 180/65.245 |
| 2018/0320783 A1* | 11/2018 | Lindstrom | B60K 6/365 |
| 2019/0276006 A1* | 9/2019 | Kasahara | F16H 3/724 |

* cited by examiner

MULTISECTION SPEED/TORQUE COMPENSATING ELECTRO-MECHANICAL ENERGY-CONVERSION DEVICE

CROSS-REFERENCE TO RELATED APPLICATIONS

This application claims the benefit of provisional patent application Ser. No. 62/606,246 filed 2017 Sep. 15 by the present inventor.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not applicable

BACKGROUND AND PRIOR ART

The following prior art appears relevant:
U.S. patent: U.S. Pat. No. 7,014,586 Electromechanical Transmission Systems, Inventor: Randall, Steven Paul. Publication Date Mar. 21, 2006
Foreign Patent Documents: CN103296951 Control Method of Birotor-Structure Variable Speed Constant Frequency Wind Power Generation System, Inventors: Song Liwei, Cui Zongze, Ciu Shumei, Wang Shiliang, Zhang Qianfan, Sheng Shan, Cheng Shukang. Publication Date Sep. 11, 2013

The invention will have a positive impact on the wind-energy industry especially when the site is combined with a natural gas source; the invention allows a wind-powered electrical generation installation to always generate rated capacity by seamlessly augmenting any lulls in the available wind energy with clean burning natural gas within the same footprint of the canopy of the wind turbine, allowing power generation companies to reduce the size of their standby fossil fuel (e.g., coal, burning plant capacity), and also creating a more distributed electrical grid, as opposed to a centralized grid; thereby, adding immunity to the grid from natural disaster, or an intentional attack. The invention may also incorporate an overrunning clutch to providing a safety function in very high wind applications where windmill blades are feathered to provide no turbine-blade motion for the safety of both the wind turbine blades and the vertical mast of the windmill.

The main difference between the Randall patent U.S. Pat. No. 7,014,586,B2 and this patent application is that the Randall patent always mentions two or more epicyclic gear sets. The basis for all of my claims is the speed torque module which has only one epicyclic gear set. The Randall patent always has to have two epicyclic gear sets. Randall never discovered the way to use only one epicyclic gear set. All of my embodiments with the exception of those shown in our FIGS. 6 and 7A, only use one speed torque module (comprising one epicyclic gear set). Further, the Randall patent never mentions algebraic summation of more than one source (or load) of mechanical power. In the Randall patent the device is repeatedly described as a transmission where one source of mechanical power is transferred through at least two epicyclic gear sets whose transfer function (gear ratio) is then determined by the action of at least two rotors; whereby, those rotors are parts of an electrical machine. My invention is of a more general nature; whereby, a single speed torque module (a single epicyclic gear set) can have the following all in one package simultaneously: (a) two external connection shafts that are bi-sense (can turn clockwise or counterclockwise), and (b) are bi-functional can accept mechanical power from a source or supply mechanical power to a load, and (c) is capable of having both rotors generating at once, both rotors motoring at once, or one rotor generating and one rotor motoring at once. This is the essence of full four-quadrant operation.

The Randall patent further never discusses or claims the ability of two (or more) mechanical prime movers driving into a plurality of input shafts (or universal coupling shafts) of the device and being able to generate optimal amounts of electrical power from the speed-torque contribution from each of the mechanical prime movers. This is accomplished in my invention by being able to reconcile the disparate speed torque characteristics of the prime movers by the ability of adjusting the speed-torque characteristics (ability to add or subtract power) of the rotors that are connected to elements of the speed torque module(s).

The Randall patent mentions that the torque applied to the output shaft is the sum of the torques on the two electrical machines. However, Randall is in error in his statement because he does not factor in the action of the gear ratios of the epicyclic gear sets in his own machine. In my invention the algebraic torque on any coupling shaft (meaning the magnitude and sense Clockwise or Counter-Clockwise) is equal to the algebraic gear-ratio-affected torque contribution of any other coupling shaft to the device and any rotor acting on the gear-train elements of the device.

ADVANTAGES

Below are several of the many advantages to my invention described in this application.
1. The invention can make full use of one or more sources of rotary mechanical power and automatically match the speed/torque profile of any, or all, of said sources to allow for maximum power transfer.
2. The invention has no fixed gear ratios and can provide an infinite variation of gear ratios to provide superior torque speed curve matching between the mechanical source of motive power, the electrical source of motive power, and the mechanical load on the device.
3. The inventions can apply or withdrawal electrical energy from their respective stator/rotor elements varies the relative speed of the mechanical gearset elements connected to the given rotors and allows the transfer function between one or more rotary power sources to be configured.
4. All shafts coupling mechanical sources/loads to the machine can be universally operated over wide speed/torque envelopes in all for quadrants, e.g., clockwise motoring, counter-clockwise motoring, clockwise generating, and counter-clockwise generating.
5. As shown in FIGS. 10 and 11, one or more of the rotors in the invention may be powered by pneumatic or fluid-power means, irrespective of the application for which the invention is employed.
6. The continuously variable gear ratios permitted by the invention allow all mechanical, electromechanical, and control-system elements to be optimally sized; thereby, limiting losses to maximum practical amounts to conserve energy and manufacturing cost.

7. The invention can provide a continuously variable gear ratio without the need for fluid couplings, mechanical braking elements, or belts, all of which give rise to mechanical losses and generate waste heat.
8. The control system of the invention can also allow one or more of the rotors to freewheel, which effectively stops the transfer of mechanical energy through the machine providing in-situ soft start or creep start capability.
9. The control system of the invention can also allow one or more of the rotors to freewheel, which effectively stops the transfer of mechanical energy through the machine providing a safety stop feature.
10. The gear ratios of the invention involved are continuously variable, and not individual stepped gear functions; therefore, the gear ratios can vary over an extremely wide range, and the machine can operate as a speed reducer, a speed increaser, or mechanical snubber, or an electrical power-take-off
11. The invention is an electromechanical mechanical operational amplifier; whereby, in the primary case— one or more sources of mechanical motive power are combined with one or more sources of electromagnetically-induced kinetic power to produce a mechanical output; or, in the secondary case, where the one or more mechanical power inputs are converted to electrical power.
12. The invention allows a wind-powered electrical generation installation to always generate rated capacity by seamlessly augmenting any lulls in the available wind energy with clean burning natural gas within the same footprint of the canopy of the wind turbine allowing power generation companies, to reduce the size of their standby fossil fuel (e.g., coal, burning plant capacity).
13. The invention allows a wind-powered electrical generation installation to always generate rated capacity by seamlessly augmenting any lulls in the available wind energy with clean burning natural gas permitting a more distributed electrical grid, as opposed to a centralized grid; thereby, adding immunity to the grid from natural disaster, or intentional attack.
14. Referring to FIG. 5, in case of a high wind safety issue, the overrunning clutch 11, 12, 13, 14 also provides a safety function in very high wind applications where windmill blades are feathered to provide no turbine-blade motion for the safety of the wind turbine blades and the vertical mast of the windmill.
15. Referring to FIG. 7A, the invention can be configured as highly-compact hybrid drive transaxle, and the addition of an additional rotor 5 can also provide an integrated right/left axle differential.
16. The invention can be configured as highly-compact continuously-variable-gear-ratio hybrid drive transaxle that embodies very high starting-torque that is beneficial applications where the torque demands on the drivetrain vary significantly, e.g., large trucks, earth-moving equipment, etc.
17. The invention can be configured as double rotor traction motor, where one rotor is electromagnetically driven, and the second rotor is surrounded by a variable-compression band brake so the invention to functions as a variable torque amplifier permitting a very heavy earth-moving or traction vehicle to pull out on a steep grade, fully loaded, while minimizing the size of the traction motor and controller needed.

BRIEF SUMMARY OF THE INVENTION

This invention titled "Multisection Speed/Torque Compensating Electro-Mechanical Energy-Conversion Device", is an electromechanical machine that uses electrical power to provide electromechanically-balanced motive torque to one or more mechanical loads, or that uses electromechanically-balanced mechanical power from one or more sources of motive torque to supply electrical power to one or more loads, while seamlessly reconciling the speed and torque differences between such loads-and-sources by use of speed-torque modules and a control means.

The invention can be constructed in numerous embodiments. It is very desirable to algebraically combine one or more sources of rotary mechanical power to one or more sources of electrically induced electromagnetic power. These sources of rotary mechanical power include, but are not limited to wind turbine power, water turbine power, combustion engine power, hydraulic motor power, inertial flywheel energy, electric motor energy, a zero-speed input and the like, etc. From the perspective of the device, the mechanical powers and electrical motive powers supplied to the device may be sourcing powers (adding power to the device) or negative powers (taking power from the device). In all cases the algebraic sum of all powers connected to the device is equal to zero (minus the efficiency losses of the device itself). The physical machine and its integral control system function seamlessly to combine the aforementioned prime-mover mechanical powers or electrically induced mechanical powers, by means of one or more sets of internal epicyclic gear sets which throughput ratios are dependent upon the algebraic differential speeds of the electromagnetically controlled rotors of the device. The Multisection Speed/Torque Compensating Electro-Mechanical Energy-Conversion machine is essentially several electric motors and/or generators, which mechanical outputs are linked to each other through sets of epicyclic gearing. The motor/generator rotors are integral parts of the machine that supply or withdraw electrical power from the mechanical components of the machine and serve to vary the throughput gear ration of the machine as viewed by the sources of mechanical power. The Multisection Speed/Torque Compensating Electro-Mechanical Energy-Conversion machine can be made to work with various motor technologies, such as, but not limited to, switched reluctance, hollow rotor, squirrel cage induction, and permanent magnet.

BRIEF DESCRIPTION OF THE SEVERAL VIEWS OF THE DRAWING

In the drawings, closely related figures have the same number but different alphabetical suffixes for right and left.

DETAILED DESCRIPTION OF THE INVENTION

Figure 1:
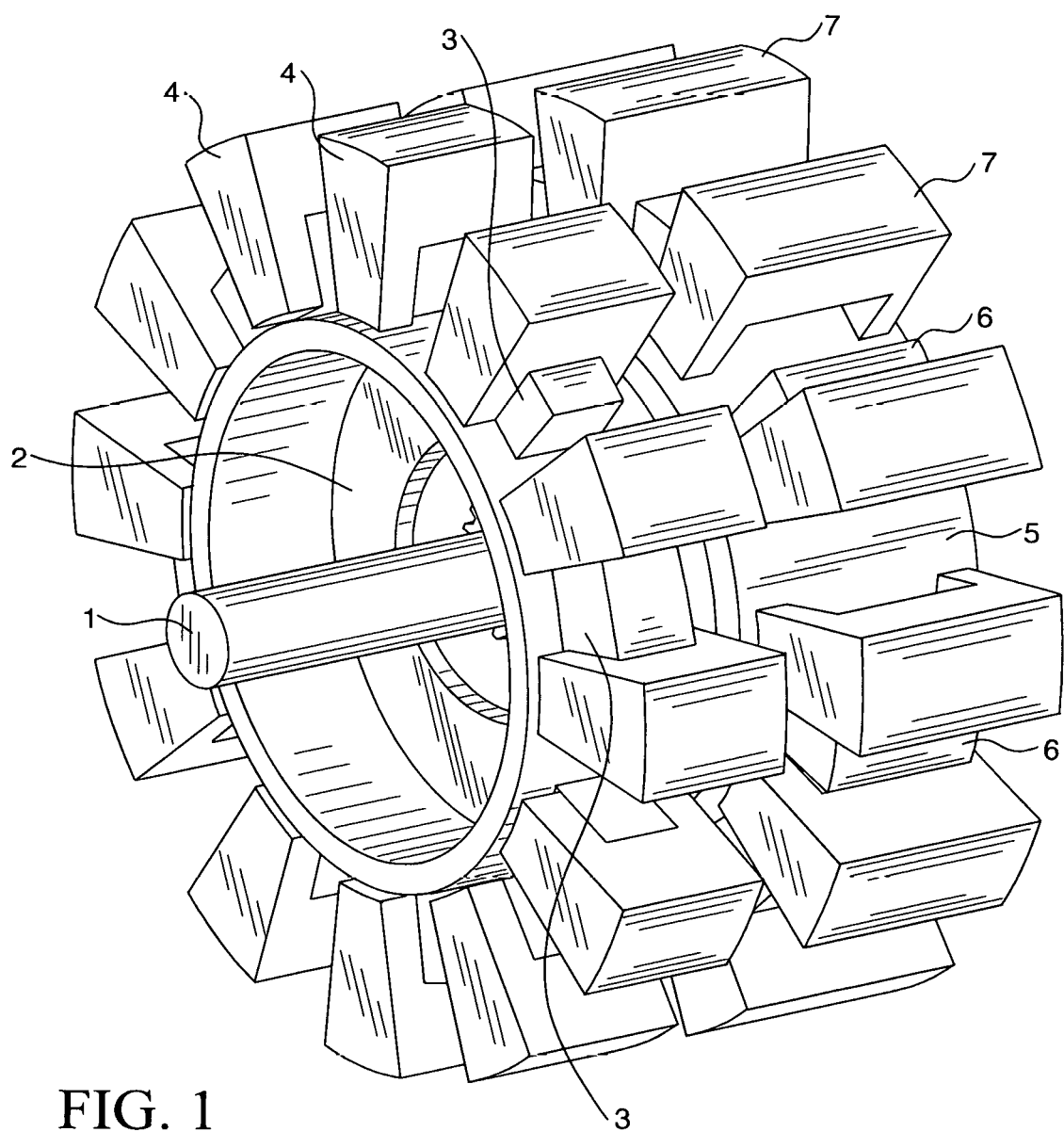
FIG. 1 is a Perspective View of Universal Electric Switched-Reluctance Style Embodiment.

The Multisection Speed/Torque Compensating Electro-Mechanical Energy-Conversion machine is a combination of an efficient multi-rotor electric machine with integral gears. Generally, the invention is an electromechanical machine that is comprised of at least a first torque module which includes a first shaft fixedly connected to at least one of an external power source or load; at least a first primary rotor and at least a first secondary rotor. Additionally, at least one rotational element coupled to a primary rotor and at least one secondary rotor rotatable in an additive mode or a differential mode. A control means is used for controlling a speed torque profile of the primary rotor and the secondary rotor, by electromechanical means, to effect a speed/torque transfer function between at least a first and second power means to said module.

The machine provides a useful universal speed compensating seamless motor/generator interface between several mechanical loads or mechanical power sources of power. The machine can provide motive torque to one or more loads at varying speeds and torque values, or generate electrical power by receiving mechanical power from one or more sources of mechanical motive power, while seamlessly reconciling the speed and torque differences between the sources. The machine is also able to transfer mechanical power from a mechanical source of power to a mechanical load while varying the speed and torque of the transfer by means of the addition or subtraction of electrical power from the machine. The machine can be embodied in various forms using a variety of electric motor or generator technologies such as AC induction, switched reluctance, permanent magnet DC, and the like which are combined with integral (internal or external) epicyclic gear sets that are arranged in coaxial, eccentric, or hypoid configurations. In a presently preferred embodiment of the invention, a switched reluctance style motor/generator elements comprises two individual sets of stators having a plurality of stator elements positioned around and spaced apart from two separate, but independent rotors of the machine.

One set of stators and its associated rotor (primary) operates in a dependent mode and the other set of stators and its associated rotor (secondary) operates in an independent mode. An integral electronic control system provides motive control of the two separate stators by sinking or sourcing electrical power to each set of stators; thereby; controlling not only the motive/generated power produced by, or derived from, the machine, but also the throughput gear ratio of the machine. In another embodiment of the machine, higher order stator/rotor/gear set combinations are employed to widen the operational torque/speed envelope of the machine or to provide other mechanical/electrical power entry/exit points.

Multisection Speed/Torque Compensating Electro-Mechanical Energy-Conversion Device can be can constructed in a large number of configurations adaptable to various uses. My invention can work in many embodiments with one epicyclic gear set and the single epicyclic gear set can have 0, 1, or 2 prime movers connected to it.

FIGS. 1,2,3, and 4—First Embodiments

Referring to FIG. 1, a perspective view of the Electric Switched-Reluctance Style embodiment is shown. Mechanical coupling shaft 1 is shown which proceeds through a hollow annulus in the drive plate portion of independent rotor 2. The integral drive poles 3 of independent rotor 2 are shown surrounded by independent stator set 4. Dependent rotor 5 is shown along with its integral drive poles 6 surrounded by dependent stator set 7.

Figure 2:
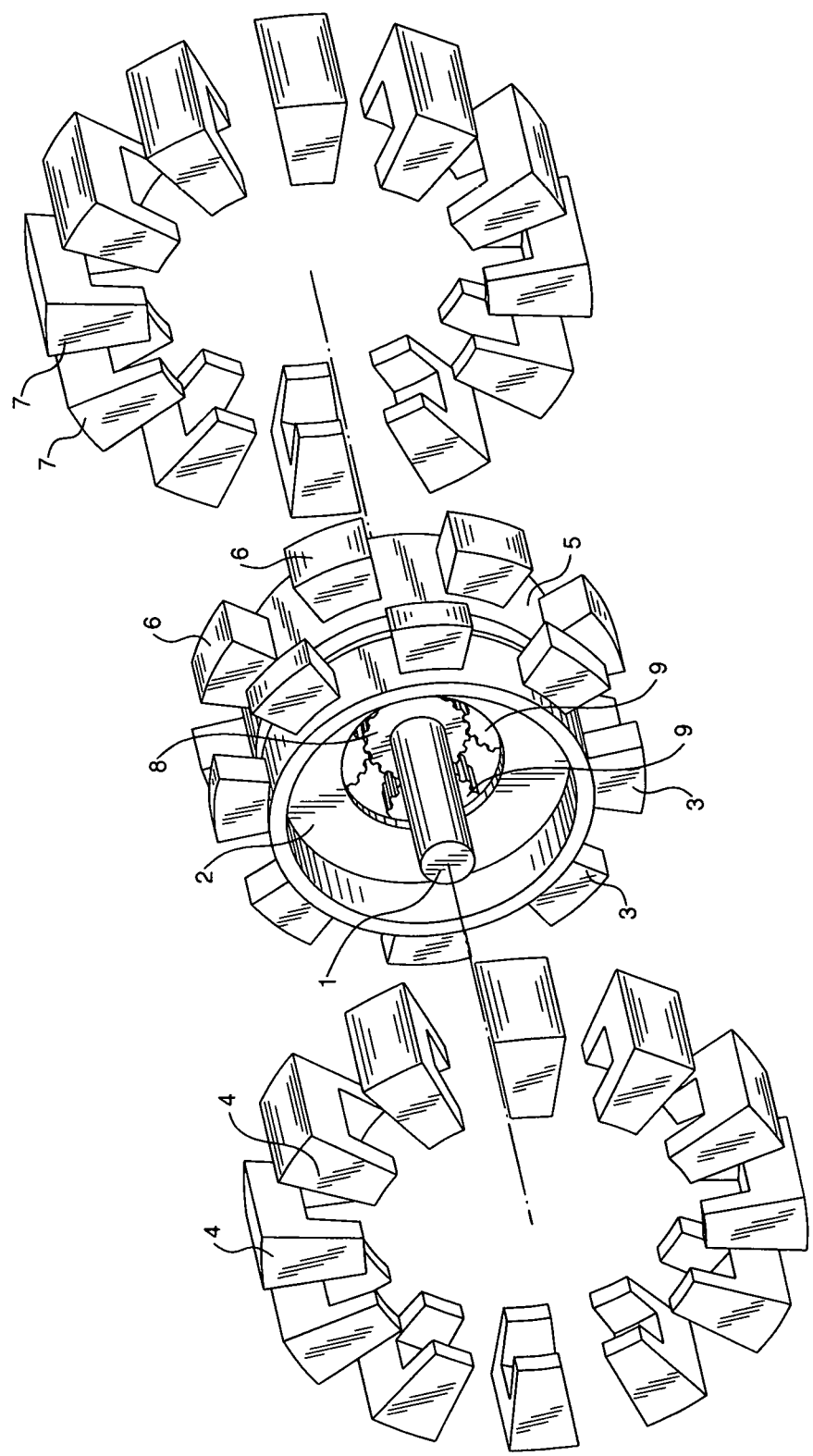
FIG. 2 is a Partially Exploded View of Universal Electric Switched-Reluctance Style Embodiment.
Figure 4:
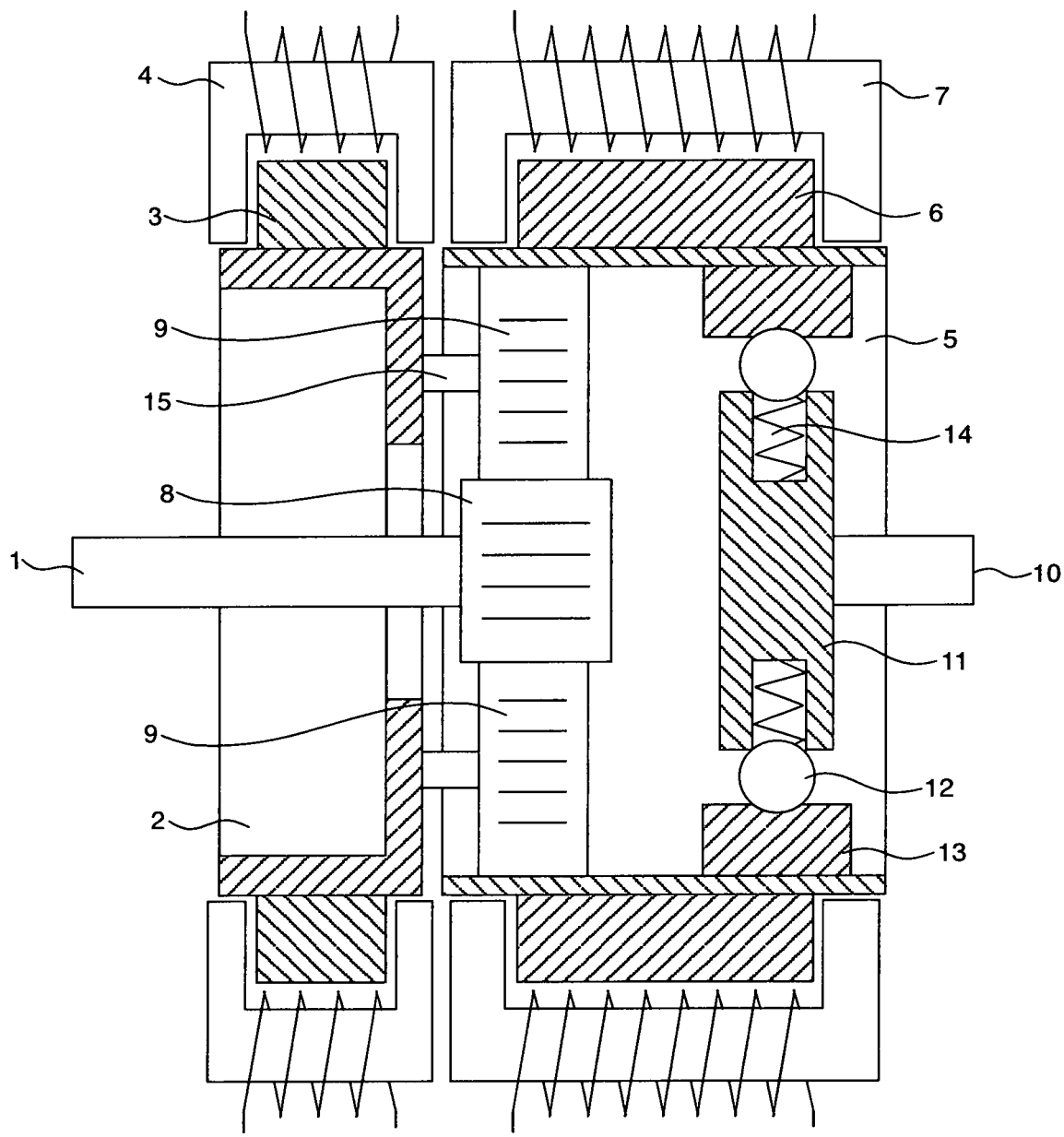
FIG. 4 is a Schematic of Universal Electric Switched-Reluctance Style Embodiment, Showing Overrunning Clutch.

With reference to FIG. 2, a partially exploded view of the Electric Switched-Reluctance Style embodiment is shown which more completely depicts the components outlined in FIG. 1 and FIG. 4. Shaft 1 is shown which proceeds through the hollow annulus in the drive plate of independent rotor 2 and connects to sun gear 8. The integral drive poles 3 of independent rotor 2 would be in surrounded by independent stator set 4 when assembled. Planet gears 9 mesh with sun gear 8 and the internal toothed annuls of dependent rotor 5. Planet gears 9 are held in place by shafts which are affixed to the drive plate portion independent rotor 2 (more clearly shown in FIG. 4). Independent rotor 2 turns about its center axis by the epicyclic kinematics of planetary gears 9 and their associated shafts. Dependent rotor 5 and its drive pole elements 6 is depicted. Drive pole elements 6 would be surrounded dependent set of stators 7 when assembled.

Figure 3:
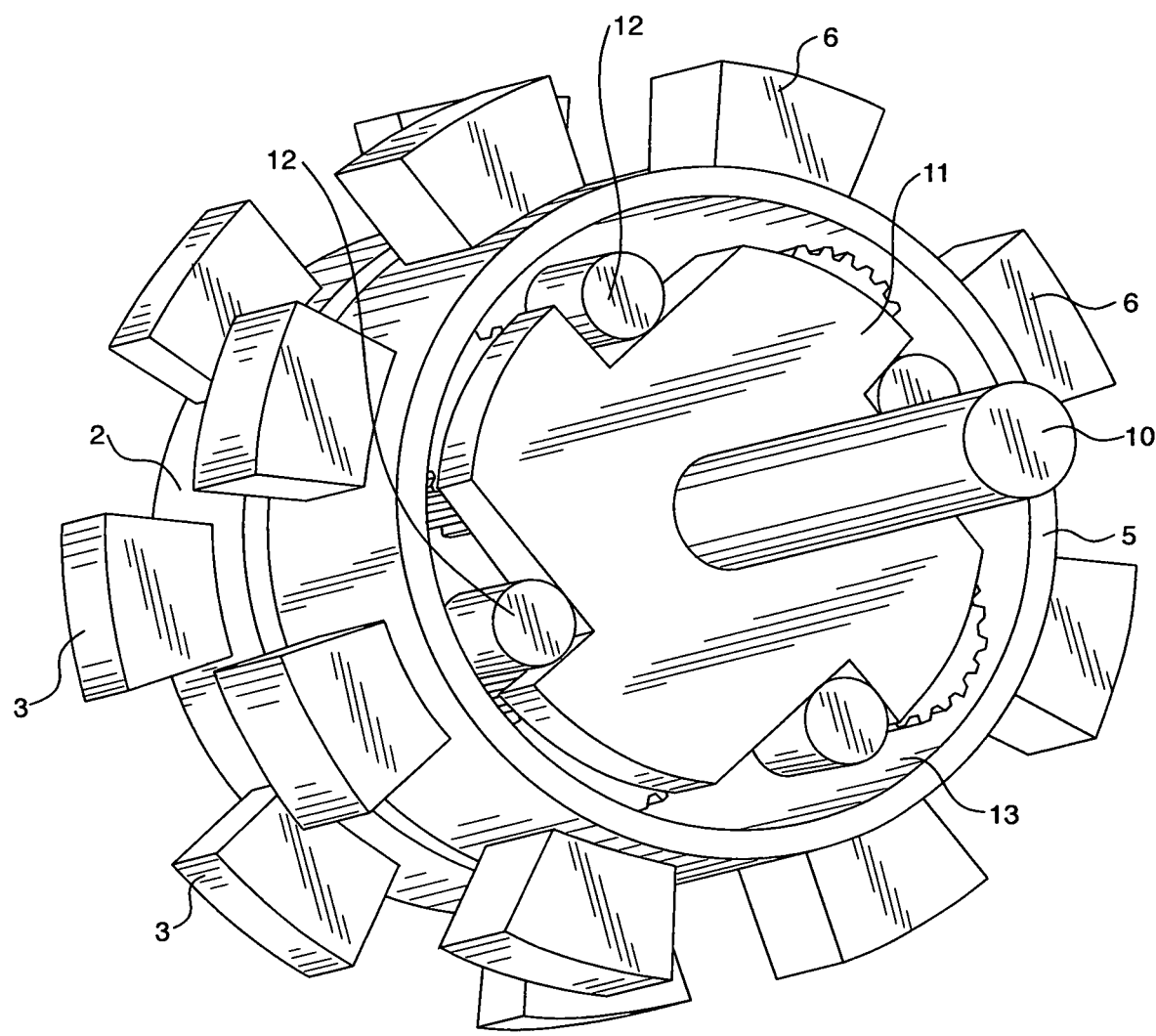
FIG. 3 is a Perspective View of Universal Electric Switched-Reluctance Style Embodiment, Showing Overrunning Clutch.

Referring to FIG. 3, an isometric view of the Electric Switched-Reluctance Style of the machine is shown which depicts the overrunning clutch assembly that is also depicted in FIG. 4. Mechanical coupling shaft 10 is shown which interfaces with overrunning clutch spider 11. Clutch spider 11 is depicted with slots which hold captive overrunning-clutch wedge-elements 12. Wedge-elements 12 act against the machined inner surface 13 of dependent rotor 5 when the angular velocity of spider 11 exceeds that of dependent rotor 5. The integral drive poles 6 of dependent rotor 5 are depicted for reference as well as the integral drive poles 3 of independent rotor 2.

With reference to FIG. 4, a schematic representation of the Electric Switched-Reluctance Style of the machine is shown. Dependent rotor 5 and its drive pole elements 6 are depicted. Surrounding the drive pole elements 6 are the dependent set of stators 7. Shaft 10 forms the mechanical interface to dependent rotor 5 via the overrunning clutch spider 11, the overrunning clutch compression springs 14, the overrunning-clutch wedge-elements 12, Wedge-elements 12 act against the machined inner surface 13 of dependent rotor 5 when the angular velocity of spider 11 exceeds that of dependent rotor 5. Shaft 1 forms the mechanical interface to sun gear 8, which meshes with planetary gears 9, which in turn mesh with the toothed annulus section of dependent rotor 5. Planetary gears 9 are held in place and rotate about shafts 15 which are in turn connected to the drive plate portion of independent rotor 2. Independent rotor 2 turns about its center axis by the epicyclic kinematics of planetary gears 9 and their associated shafts 15. Relevant to independent rotor 2 are drive pole elements 3 and associated drive stators 4.

NOTE—The Machines shown in FIGS. 1, 2, 3, 4, and 5, all share an assembly hereafter referred to as a "Speed Torque Module." The Speed Torque Module is more clearly depicted in FIG. 4 except for the overrunning clutch elements 10, 11, 12, 13, and 14. Therefore, the Speed Torque Module is clearly shown in FIG. 4 as elements 1, 2, 3, 4, 5, 6, 7, 8, 9, and 15. The concept of the Speed Torque Module is extensively used in the description of drawings and in the claims.

Figure 5:
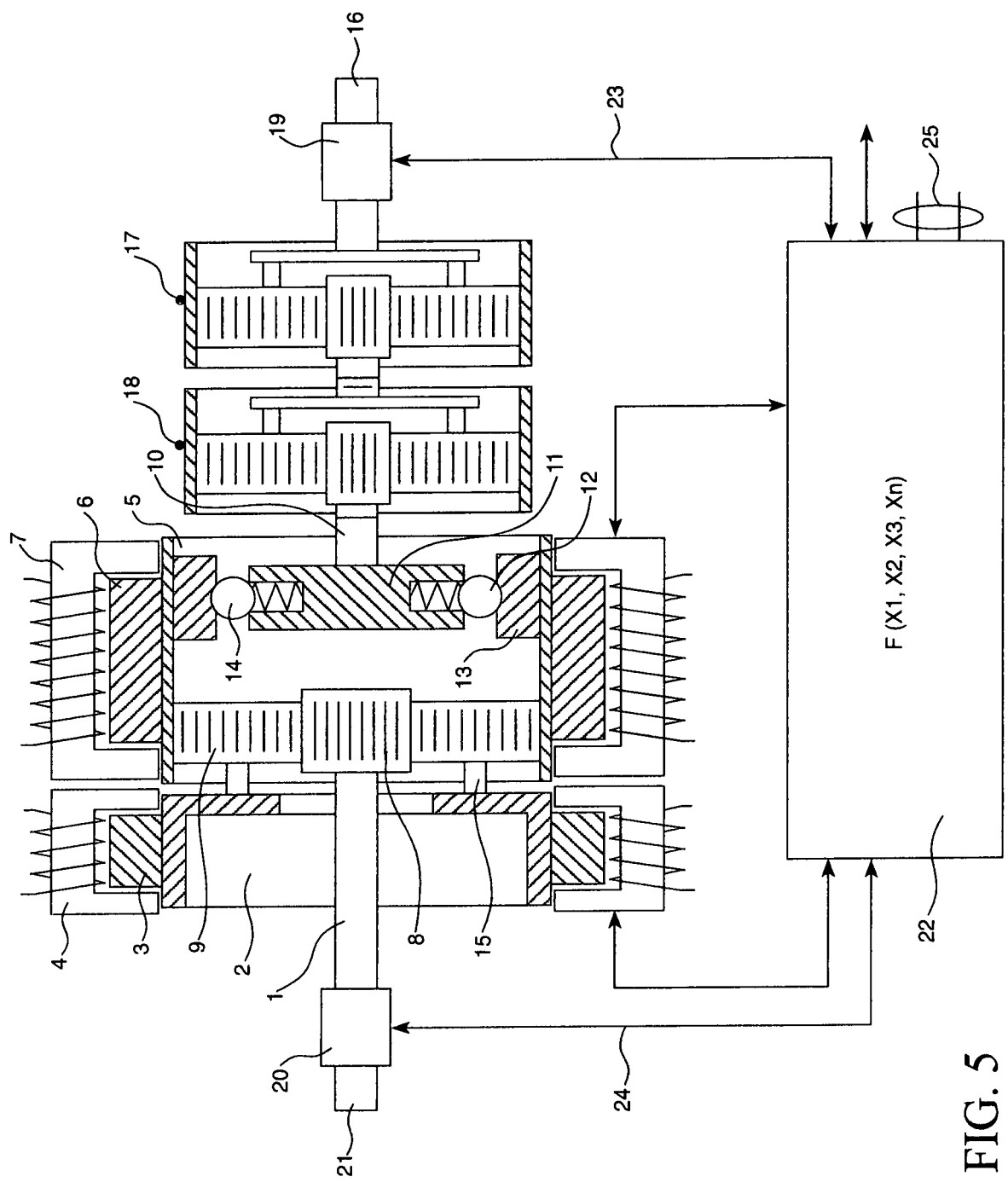
FIG. 5 is a Mechanical Schematic of Wind/Gas Embodiment and Lumped-Parameter Control Means.

FIG. 5—Additional Embodiment—Wind Gas Turbine

In this embodiment, the wind gas turbine functions as a generator that automatically reconciles the speed of two disparate mechanical power inputs; one of the inputs being a low-speed/high-torque input similar to a wind turbine (typical values for 1 MW wind turbine –1,400 hp, 15 RPM, 500,000 lb. ft.). This system forms a controlled power balance between a primary power generation source, i.e., the wind turbine, and the auxiliary (make up) power source, i.e., the gas fired turbine. The primary function is to transform one or more sources of mechanical motive power to one electrical power output. A secondary function in this case is to provide an electrically actuated mechanical power output to a gas fired turbine to "start" the turbine.

The purpose of the system is to provide a reliably "rated" electrical generating capacity continuously utilizing instantaneously available mechanical wind energy and supplementing that energy with reliable cheap mechanical energy garnered from a natural gas fired turbine. This system is designed to be compact enough to be located within the nacelle of a windmill and allows the wind-generating installation to produce zero emission energy in high wind conditions, low emission energy in sub-optimal wind conditions, and to always provide 100% of rated electrical power to the local receptor grid.

For example, a 1-megawatt machine is located where there is 500 kW of wind power available, but the full output of 1 MW is desired. In that case, the control system fires the turbine at the proper fuel mixture to produce 500 kW of "make up" power. If the wind speed drops, and consequently, the wind power drops to an availability of 400 kW, the control system will boost the fuel delivery to the gas turbine to now produce 600 kW of "make up" power. The amounts of electrical power drawn from rotor 2, as opposed to the electrical power pulled from rotor 9, varies the gear ratio inside of the machine algebraically and combines the two sources of mechanical power together over widely disparate speed-torque curves; thereby, forming an electrical/mechanical power balance. The following analyses below shows how the invention can seamlessly compensate for various wind conditions related to the embodiment shown and described in FIG. 5.

The invention described below describes how the device can operate in generation conditions where all motive mechanical power is provided by an energy source such as wind; or, where all motive mechanical power is provided by an auxiliary source of mechanical power such as a gas turbine; where the motive mechanical power is coming from split sources, such as wind and a gas turbine, simultaneously; or where one of the sources of mechanical power must be locked out for safety reasons.

Referring to FIG. 5, in the case of all wind, the prime mover is, for example, a gas turbine, connected to shaft 21 and is turned off. The turbine energy is supplied to shaft 16 and ultimately to shaft 10 by means of speed increasers 17, 18. In this case the control system 22 turns off pole/stator set 3, 4, which allows rotor 2 to freewheel. Rotor 2 is then freewheels owing to the interaction of planet gears 9 whose gear teeth mesh with the internal gear teeth of rotor 5, and minimal power is transferred to sun gear 8 by planet gears 9. This permits the prime mover connected to shaft 21 to be stationary. In this case all generated electrical power is derived from the electrotechnical interaction of pole/stator set 6, 7.

Referring to FIG. 5, in a partial-wind condition, low speed/high torque power presented to shaft 10 (via speed increasers 17, 18) is reconciled with high speed/low torque power presented to shaft 21. This is accomplished by commanding stator set 4 to provide the appropriate back torque to rotor 2 to achieve an optimal velocity of planet gear carriers to set up an appropriate gear ratio of gear train 8, 9 whereby the input speed of shaft 21 is reconciled with the input speed of shaft 10. The overall function is governed by control system 22 via torque speed monitors 19, 20 and the functional relationship of the gear ratios of the machine and the control-system algorithm.

In the case of an all-gas turbine application, and no wind, shafts 16, 10 are stalled because of the lack wind. In such case, overrunning clutch 11, 12, 13, 14 permits rotor 5 to turn only by the gas turbine power applied to shaft 21 and the back torque created on planetary drive axles connected to rotor 2 and associated pole/stator set 3, 4.

Referring to FIG. 5, in case of a high wind safety issue, the overrunning clutch 11, 12, 13, 14 also provides a safety function in very high wind applications where windmill blades are feathered to provide no turbine-blade motion for the safety of the wind turbine blades and the vertical mast of the windmill. From a generation point of view, this case then effectively becomes one in which all motive mechanical power is derived from the Gas Turbine.

In the field of alternative energy generation, the present invention makes full use of all wind energy available at any given time, and seamlessly augments any lulls in the available wind energy with clean burning natural gas within the same footprint of the canopy of the wind turbine. This allows a wind installation to generate 100% of capacity around the clock, and allows the purchaser of the energy, i.e., power generation companies, to reduce the size of their fossil fuel (e.g., coal, burning plant capacity). The invention also provides additional power to more distributed power grids, as opposed to a centralized grid; thereby, adding immunity to the grid from natural disaster, or intentional attack.

FIG. 5 is a block diagram for a Wind/Gas Embodiment and Lumped-Parameter Control Means of the Multisection Speed/Torque Compensating Electro-Mechanical Energy-Conversion machine and is shown for the Switched-Reluctance Style Embodiment. In this embodiment, the Multisection Speed/Torque Compensating Electro-Mechanical Energy-Conversion machine is used as a generator that can accept a high-speed, low-torque mechanical power input on shaft 21, and a low-speed high-torque input on shaft 16 to generate power. FIG. 5 also contains speed increaser assemblies 17 and 18, which are not part of the invention.

A variable low-speed high-torque mechanical input (of the proper rotational sense) is applied to shaft 16 which interfaces with speed/torque monitoring device 19. The mechanical output of 19 is then applied to speed increaser 17, and the mechanical output of 17 is then applied to speed increaser 18. The output of 18 is then applied to shaft 10 which interfaces with the spider 11 of the overrunning clutch assembly. Wedge-elements 12 of the overrunning clutch assembly, aided by the action of springs 14, engage the machined inner surface 13 of dependent rotor 5 causing the rotor to spin. The motion of rotor 5, whose inner splined surface meshes with planet gears 9 cause planet gears 9 to rotate in an epicyclic fashion and impart a rotational force on independent rotor 2, via planet gear axles 15, causing independent rotor 2 to spin. A variable high-speed low-torque mechanical input is applied to shaft 21 which interfaces with speed/torque monitoring device 20, and the mechanical output of 20 is applied to shaft 1 which interfaces with sun gear 8. As sun gear 8 rotates, it provides mechanical energy to the epicyclic gear set formed by sun gear 8, planet gears 9, dependent rotor 5, planet gear axles 15, and independent rotor 2. Dependent rotor 5 interacts electromagnetically with stator set 7 via drive poles 6 to allow electrical energy to be imparted or extracted (from stator set 7) via the electronic control system 22. Independent rotor 2 electromagnetically interacts with stator set 4 via drive poles 3 permitting electrical energy to be imparted or extracted from stator set 4 to the electronic control system 22. Control system 22 can receive electrical power from stator set 4 in to generate electrical energy by means of independent rotor 2, and control system 22 may inject electrical energy into stator set 4 to slow down, stop, or counter-rotate to vary the gear ratio established by sun gear 8, planet gears 9, dependent rotor 5, planet gear axles 15 and independent rotor 2.

In this embodiment, control system 22 receives torque and speed inputs from each source of mechanical motive power by means of a speed/torque monitoring device 19 and 20 over communication links 23 and 24. Control system 22 then calculates the overall amount of electrical power that can be generated and withdraws primary power from the dependent rotor 5 and its stator set 7. The control system then withdraws secondary power from independent rotor 2 and its stator set 4 to impart the proper amount of back torque onto independent rotor 2. This allows independent rotor 2 to spin at a speed that is appropriate to establish a gear ratio within the epicyclic gear sets (15, 9, 8, 2 and 5) that effectively matches the speed of shaft 10 with the speed of shaft 1. In this method, the device forms a seamless power balance between two varying sources of mechanical motive input power and effectively reconciles any speed/torque imbalance between the two varying-sources of mechanical motive input power. In this embodiment, the overrunning clutch assemblies 11, 12, 13, 14 serve to allow the device to operate if the source of motive mechanical input power directed to shaft 16 stops (such as a windmill in still-air conditions). Electrical and control interface with the "outside world" is through power/control bus 25.

Figure 6:
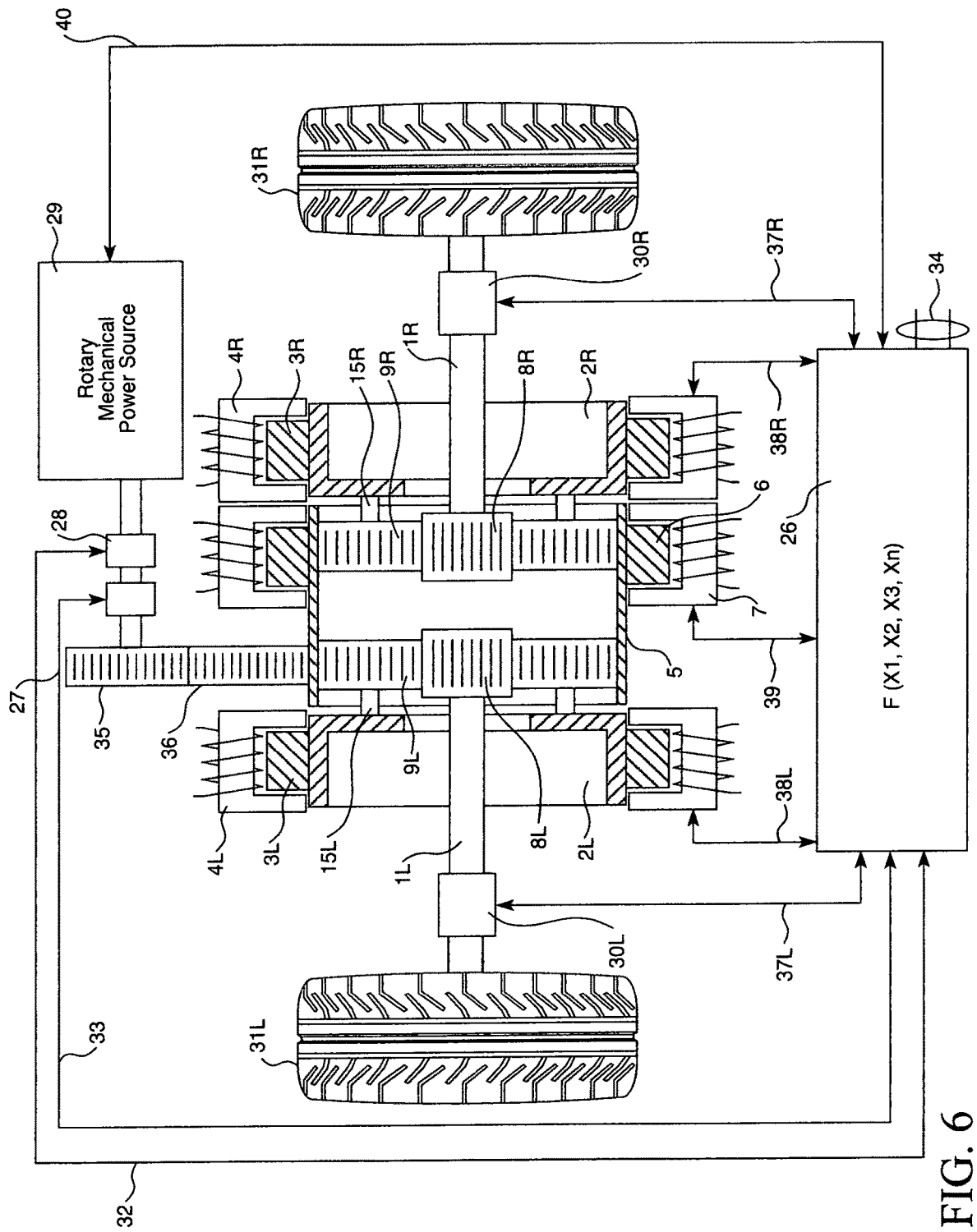
FIG. 6 is a Mechanical Schematic of Hybrid-Electric Drivetrain Embodiment and Lumped-Parameter Control Means.

FIG. 6—Additional Embodiment—Parallel Hybrid Vehicle Drivetrain

In this embodiment, the Multisection Speed/Torque Compensating Electro-Mechanical Energy-Conversion device produces a rotational mechanical output for vehicular propulsion. The device produces the mechanical output from a combination of mechanical energy from a combustion engine, and the seamless parallel injection or withdrawal of electrical energy from a storage source via an electrical controller/drive circuit. The electrical portion of this device is a four-quadrant device that can also serve as a generator and/or a regenerative braking device. In this embodiment, the Multisection Speed/Torque Compensating Electro-Mechanical Energy-Conversion device is an electromechanical mechanical operational amplifier; whereby, in the primary case—one or more sources of mechanical motive power are combined with one or more sources of electromagnetically induced kinetic power to produce a mechanical output; or, in the secondary case, where the one or more mechanical power inputs are converted to electrical power to perform battery charging or regenerative braking.

This embodiment allows a combustion engine and an electrical power pack to drive a hybrid-electric vehicle simultaneously using parallel drive scheme. In this case, the term parallel means that the mechanical prime mover, i.e., the combustion engine, and the electrical reserve system drive the vehicle simultaneously via a mechanical "summing junction" provided by the invention. The invention provides for a highly compact hybrid drive transaxle, and the addition of an additional rotor/gearset can also provide an integrated right/left axle differential.

This system has one input shaft from a mechanical prime mover such as a combustion engine, and provisions for electrical connections to the rotor/stator/gearset combinations of the system. The system functions by having at least two rotors containing at least 2 poles that can function as generating and or motoring rotors. The rotors are mechanically linked to gearing elements within the machine, and the rotors are mechanically coupled with a stator assembly containing at least two poles. The control means supplies or withdraws electrical energy from the stator/pole assembly that corresponds to a given rotor, thereby commanding the speed/torque profile of that rotor. The control means may perform this function with any stator/pole/rotor correspondence comprising the machine.

The application or withdrawal of energy from the respective stator/rotor elements varies the relative speed of the mechanical gearset elements connected to the given rotors. This interaction of the gearset elements, when being acted upon, by at least two rotor/stator/gearset combinations, by which the speed differentials give rise to a machine throughput speed from the mechanical prime mover, equal to the rotor speed differential/gearset combination. The control system can also allow one or more of the rotors to freewheel, which effectively stops the transfer of mechanical prime mover energy through the machine. The system allows the vehicle to be driven on 100% mechanical energy from the mechanical prime mover, 100% electrical energy from the storage device, or any seamless combination of the two. The system also provides for the recapture of kinetic braking energy and allows the mechanical prime mover to recharge the storage battery if desired.

This embodiment of the Multisection Speed/Torque Compensating Electro-Mechanical Energy-Conversion device enhances hybrid-vehicle efficiency by performing three novel functions simultaneously. First, the device has no fixed gear ratios and can provide an infinite variation of gear ratios to provide superior torque speed curve matching between the mechanical source of motive power, the electrical source of motive power, and the mechanical load on the device. In addition, the device can provide a continuously variable gear ratio without the need for fluid couplings, mechanical braking elements, or belts, all of which give rise to mechanical losses. Furthermore, the Multisection Speed/Torque Compensating Electro-Mechanical Energy-Conversion device can recover a large portion of any electrical energy used to provide power to the control rotors.

FIG. 6 is a Mechanical Schematic of Hybrid-Electric Drivetrain Embodiment and Lumped-Parameter Control Means for the Switched-Reluctance Style Embodiment and is easily described by using the Speed Torque Module concept as introduced in the FIG. 4 description. The embodiment shown in FIG. 6 is essentially built from a "Left" Speed Torque Module 1L, 2L, 3L, 4L, 5, 6, 7, 8L, 9L, 15L, and a "Right" Speed Torque Module 1R, 2R, 3R, 4R, 5, 6, 7, 8R, 9R, and 15R. The Left Speed Torque Module and the Right Speed Torque Module are joined by common dependent rotor 5, a common set of dependent drive poles 6, and a common set of dependent drive stators 7. A rotary source of mechanical power 29 is coupled to dependent rotor 5 by gears 35 and 36. This connection provides mechanical power from the external power source 29 to the common dependent rotor 5 causing the rotor 5 to spin. The rotary action of rotor 5 causes planet gears 9(L-R) to rotate thereby driving independent rotors 2(L-R). The speed and torque of external power source 29 is monitored by speed sensor 27 and torque sensor 28. The output of speed sensor 27 is connected to the control system 26 by signal bus 33, and the output of torque sensor 28 is connected to the control system 26 by signal bus 32. Output shafts 1(L) and 1(R) are connected to vehicle drive wheels 31(L) and 31(R), respectively, by means of torque sensors 30(L) and 30(R) which are in turn connected to control system 26 by signal busses 37(L) and 37(R), respectively. Control system 26 is connected to a traction battery-pack on the vehicle, and to the vehicle's overall control system by means of power/data buss 34. Based on the mechanical power needs of the vehicle, control system 26 operates mechanical power source 29 by buss 40 to provide mechanical power to rotor 5, and then add or subtract mechanical power from rotor 5 by employing stator 7/pole set 6 as either a motor or generator through buss 39. Control system 26 commands the motive power required for each drive wheel by separately controlling the stator/pole sets 4(L) and 4(R), 3(L) and 4(R) of Left or Right Speed Torque Module, respectively, through buses 38(L and R). Torque sensors 30(L) and 30(R) provide a closed loop feedback to control system 26 for the common-mode or differential control of the Left and Right Speed Torque Modules. Control system 26 can also command one wheel to counter-rotate by the interaction of stator pole/pole set 4L or stator/pole set 4R, 3R to provide for active (or close quarters) steering/traction control.

Figure 7A:
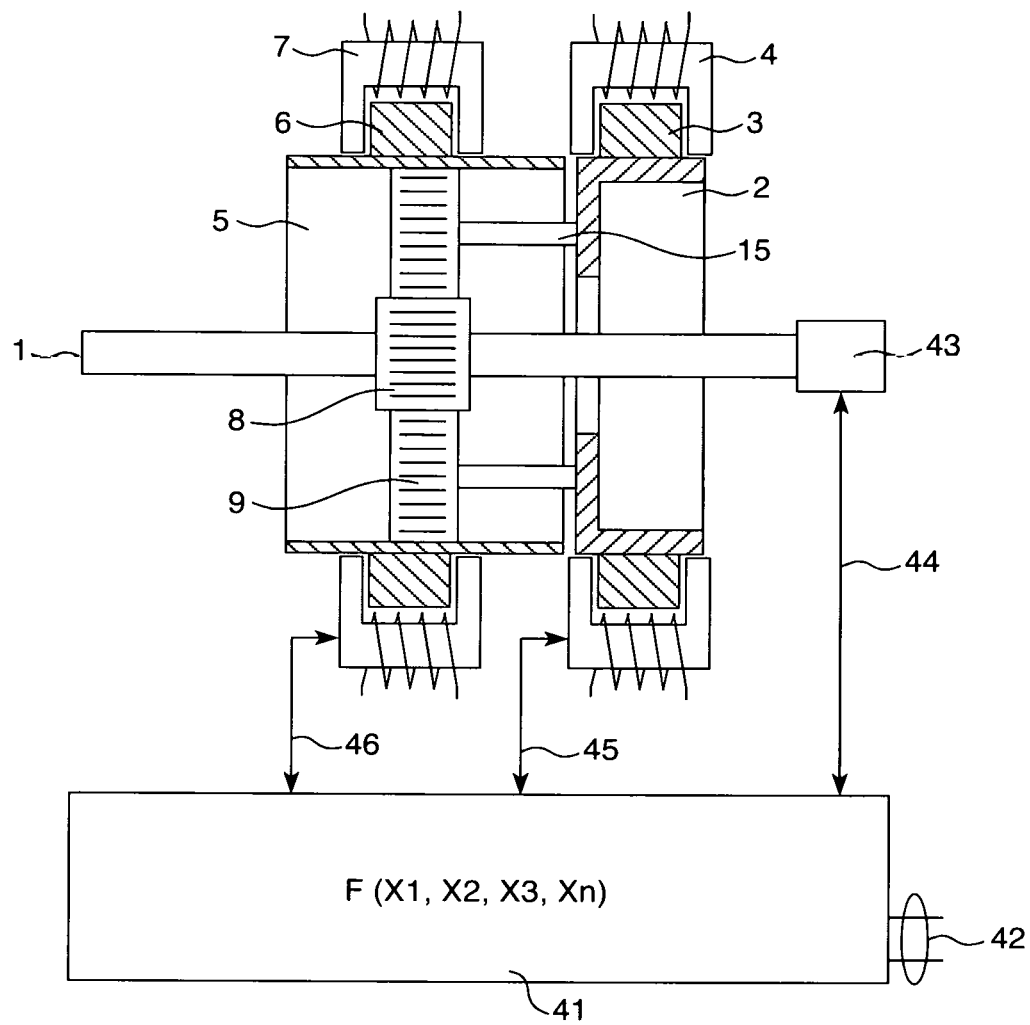
FIG. 7A is a Mechanical Schematic of Continuously Variable Electrically-Powered Transmission Embodiment and Lumped-Parameter Control Means.
Figure 7B:
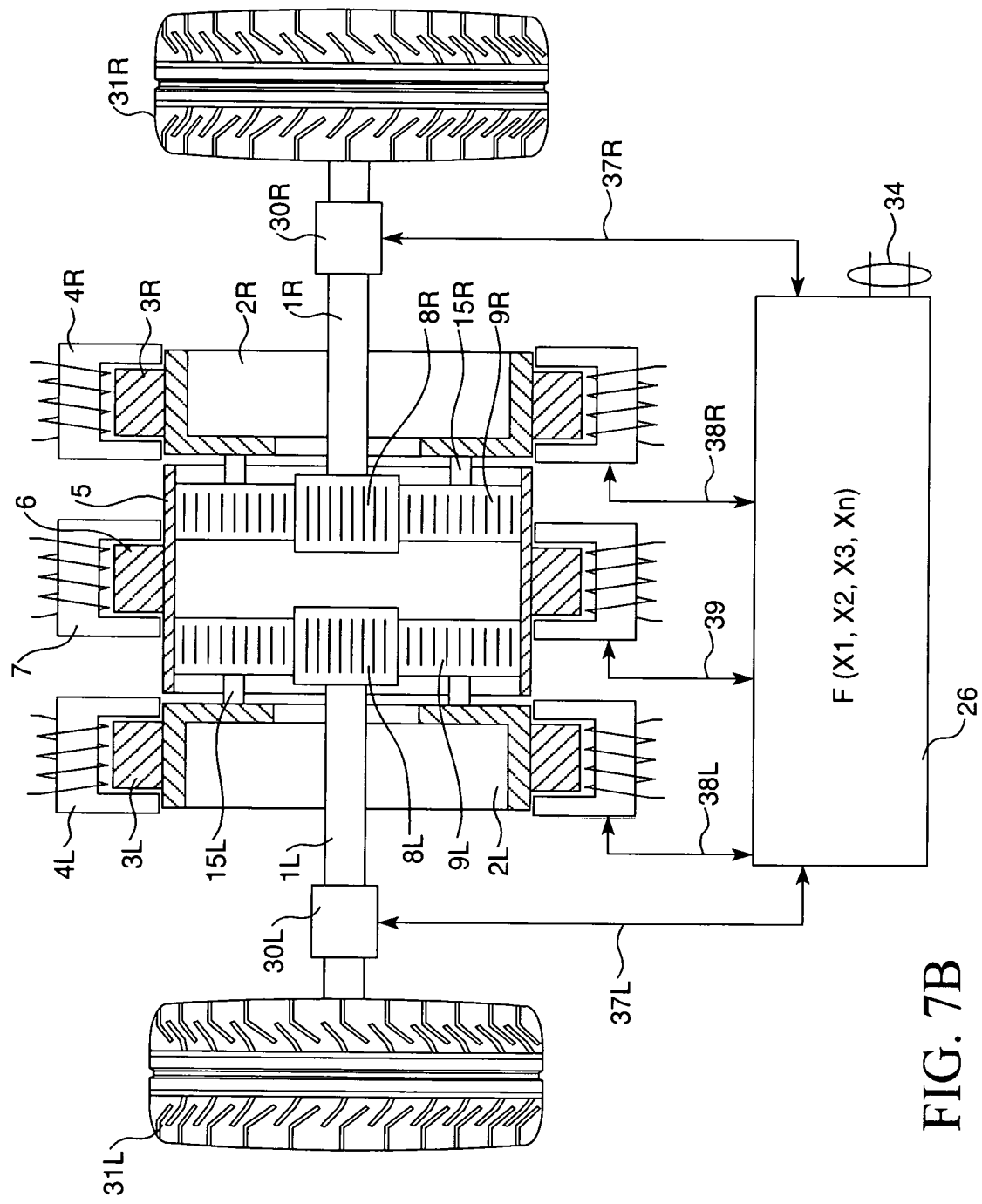
FIG. 7B is a Mechanical Schematic of Compact Electric Drivetrain with Integral Continuously Variable Transmission and Torque-Balancing Differential Embodiment and Control Means.

FIG. 7—Additional Embodiment—Continuously Variable Transmission

In this embodiment, the Multisection Speed/Torque Compensating Electro-Mechanical Energy-Conversion device functions as an electromechanical device that allows the speed of the output shaft (x) of a mechanical prime mover to be continuously varied from zero to several times (x), where x is a positive or negative real number, with no discontinuity of motion, and no integer gear-ratio steps. The device can also function as an electrical power-take-off device if needed, or as the main drive component in a human-hybrid bicycle. The purpose of this embodiment is to provide a smooth continuously variable speed output for industrial processes or transportation applications. The input to this device is a mechanical prime mover such as a combustion engine, gas fired turbine, steam turbine, water-fed turbine, pedal power or the like. All of the aforementioned prime movers, by nature, have "peaked" speed/torque curves and being able to match these "peaked" speed torque curves to the speeds/torques required by industrial, mining, and vehicle propulsion applications is particularly advantageous. It is especially advantageous if the gear ratios involved are continuously variable, and not individual stepped gear functions. These ratios can vary over an extremely wide range, and the machine can operate as a speed reducer, a speed increaser, or mechanical soft start, or an electrical power-take-off.

This embodiment functions by having at least two rotors containing at least 2 poles that can function as generating and/or motoring rotors. The rotors are mechanically linked to gearing elements within the device and are each magnetically linked with a stator assembly containing at least two poles. The rotors are commanded by a control system that allows electrical energy to be withdrawn from the stator(s), via the magnetic interaction with the rotors respective stator assembly or allows electrical energy to be supplied to the stator assembly, and then applied to their respective rotor via magnetic interaction.

The application or withdrawal of energy from the respective stator/rotor elements varies the relative speed of the mechanical gearset elements connected to the given rotors. This interaction of the gearset elements, when being acted upon, by at least two rotor/stator/gearset combinations, by which the speed differentials give rise to a machine throughput speed equal to the rotor speed differential/gearset combination. The control system can also allow one or more of the rotors to freewheel, which effectively stops the transfer of mechanical energy through the machine. The control system accomplishes these tasks by monitoring the torque speed input of the mechanical sources and then seeks to match these sources to the mechanical demands of the machine being powered by the output of the invention. The mechanical demands of the powered machine may be known, or may themselves be monitored, and fed back to the controls system via closed-loop feedback.

In this embodiment the Multisection Speed/Torque Compensating Electro-Mechanical Energy-Conversion device efficiency enhances by performing three novel functions simultaneously. Firstly, the device has no fixed gear ratios and can provide an infinite variation of gear ratios to provide superior torque speed curves matching between the mechanical source of motive power, the electrical source of motive power, and the mechanical load on the device. Additionally, the device can provide a continuously variable gear ratio without the need for fluid couplings, mechanical braking elements or belts which give rise to mechanical losses. Thirdly, this embodiment can recover large portions of any electrical energy used to provide power to the control rotors.

FIG. 7 is a Mechanical Schematic of Continuously Variable Electrically-Powered Transmission and Lumped-Parameter Control Means for the Switched-Reluctance Embodiment. This embodiment is built from a single Speed Torque Module 1, 2, 3, 4, 5, 6, 7, 8, 9, 15 and a "lumped" parameter Control system 41. Control system 41, based on the control and electrical power inputs on buss 42, commands dependent rotor 5 to rotate via stator/pole sets 7,6 via buss 46 which in turn causes planet gears 9 to epicyclically rotate causing dependent rotor 2 to spin via coupling shaft 15. Control system 41, based on the control and electrical power inputs on buss 42, requires dependent rotor 2 to add or subtract torque from the overall system via buss 45 and stator/pole set 4, 3. The addition or subtraction of torque from the system by virtue of the motor or generator action of stator/pole set 4, 3 thereby varies the speed of independent rotor 2 and varies the overall gear ratio of the device by the epicyclic action of planet gears 9, providing output shaft 1 an extremely wide speed torque range. Speed sensor 43 provides a closed loop control to control system 41 via signal buss 44.

FIG. 7A is a Mechanical Schematic Embodiment of a Compact Electric Drive Train with an Integral Continuously Variable Transmission and Torque-Balancing Differential as well as a Lumped-Parameter Control Means for the Switched-Reluctance Style motor technology as shown. This embodiment can be easily understood by the use of the Speed Torque Module concept as introduced in the FIG. 4 description. The embodiment shown in FIG. 7a is essentially built from a "Left" Speed Torque Module 1L, 2L, 3L, 4L, 5,6, 7, 8L, 9L, 15L, and a "Right" Speed Torque Module 1R, 2R, 3R, 4R, 5, 6, 7, 8R, 9R, and 15R. The Left and Right Speed Torque Modules are united by a common dependent rotor 5, a common set of dependent drive poles 6, and a common set of dependent drive stators 7. The rotary action of rotor 5 (imparted by the electromagnetic interaction of pole-set 6 and stator-set 7) causes the planet gears 9(L-R) to rotate thereby driving independent rotors 2(L-R). Speed Torque Modules (L-R) output shafts 1(L-R) are connected to vehicle drive wheels 31(L-R) respectively via torque sensors 30(L-R) which are in turn connected to control system 26 via signal busses 37(L-R) respectively. Control system 26 is connected to the traction battery-pack of the vehicle, and to the vehicle's overall control system, via power/data buss 34. Based on the mechanical power needs of the vehicle, control system 26 sources (or sinks) electrical energy to stator set 7 by means of buss 39, and the electromagnetic interaction of stator-set 7 and pole-set 6 provide mechanical power to rotor 5. Control system 26 commands the motive power required for each drive wheel by separately controlling the stator/pole sets 4(L-R) and 3(L-R) of the left and right Speed Torque Modules, respectively via busses 38(L-R). Torque sensors 30(L-R) provide a closed loop feedback to control system 26 for the common-mode or differential control of the Left Speed Torque Module and the Right Speed Torque Module. Control system 26 can also command one wheel to counter-rotate by the interaction of stator pole/pole set 4L, 3L or stator/pole set 4R, 3R to provide for active (or close quarters) steering/traction control.

Figure 8:
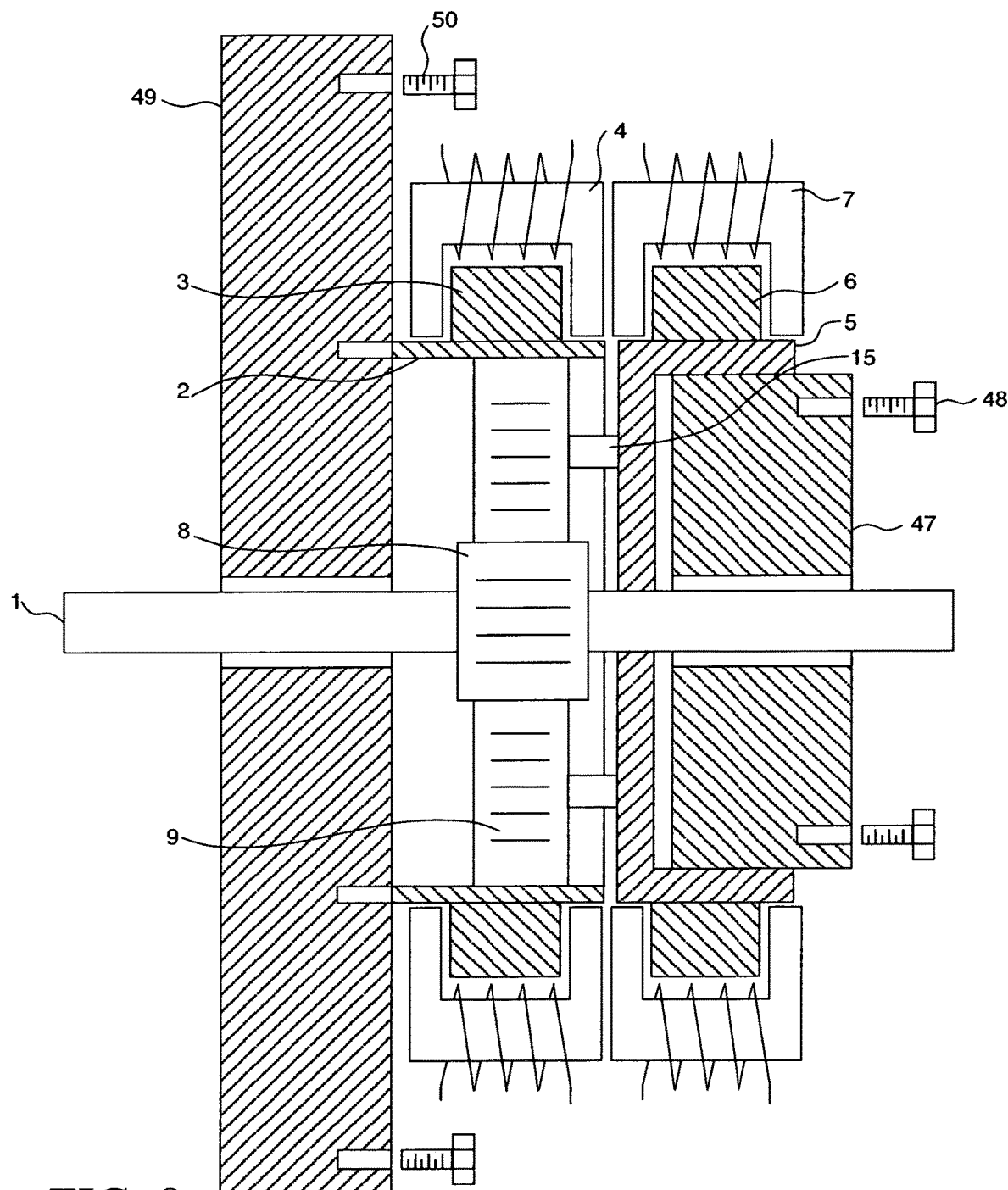
FIG. 8 is a Mechanical Schematic of Electric Version of Multi-Rotor High-Torque Wheel-Hub Motor.
Figure 9:
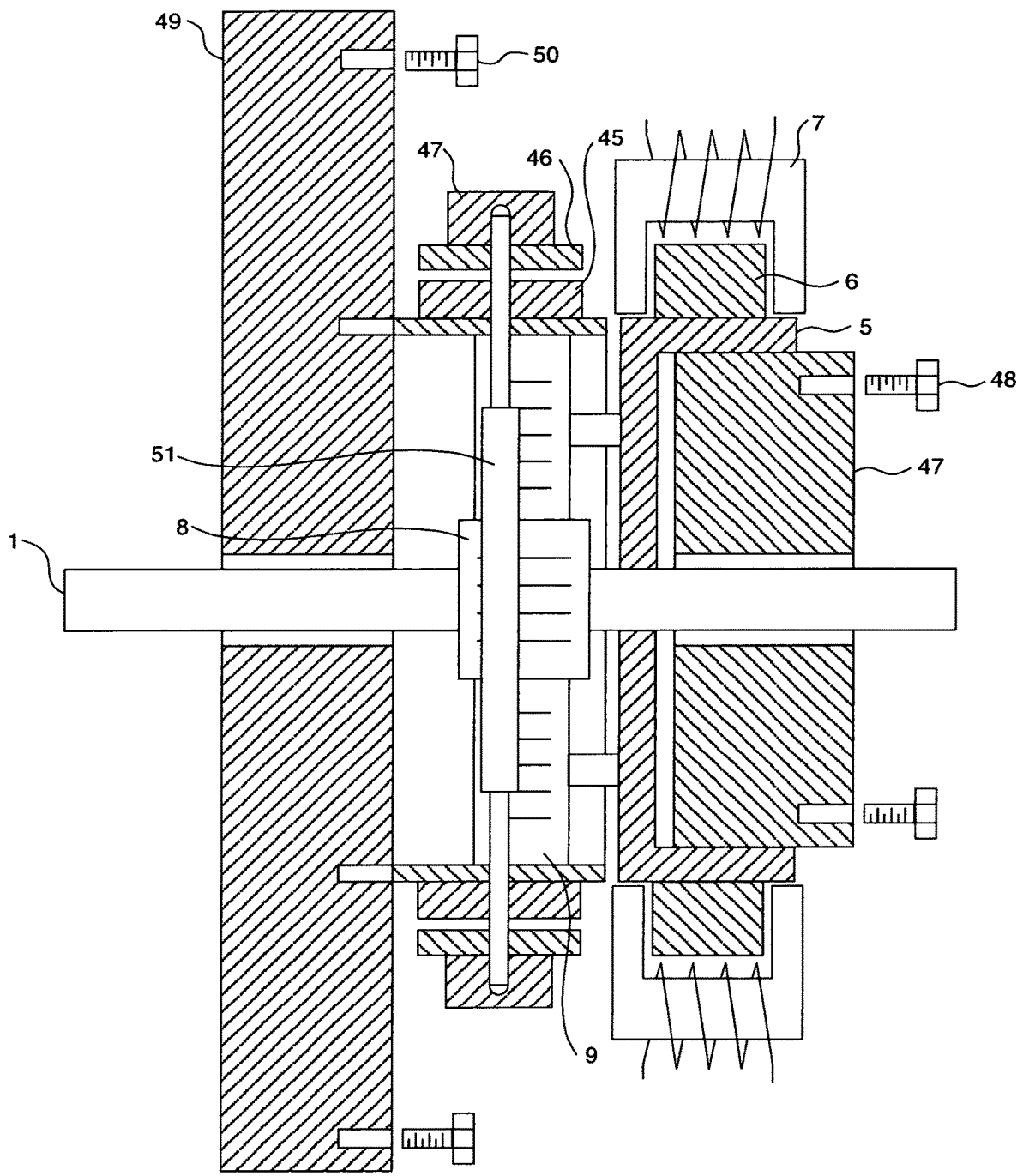
FIG. 9 is a Mechanical Schematic of Multi-Rotor Brake-Band Style High-Torque Wheel-Hub Motor.

FIGS. 8 and 9—Additional Embodiment—Variable Torque Amplifier

In this embodiment, the Multisection Speed/Torque Compensating Electro-Mechanical Energy-Conversion device produces a rotational mechanical output from one or more electrically driven rotors within the machine. One preferred use of this embodiment is a compact torque hub for large earthmoving or traction vehicles. This embodiment has two or more possible cases of implementation depending on the level of efficiency and/or sophistication required for the application, the simple case and the complex case.

In a simple operational case the Multisection Speed/Torque Compensating Electro-Mechanical Energy-Conversion device is set up as a double rotor machine, where one rotor is propelled by the motor action of a set of electromagnetic poles and stators, and the second rotor is surrounded by a variable-compression band brake. In this case the device functions as a variable torque amplifier to allow a very heavy earth-moving or traction vehicle to pull out on a steep grade, fully loaded, while minimizing the size of the traction motor and controller needed. As the compression on the band brake increases; thereby, impinging on the free motion of the control rotor, the output shaft begins to turn at a rate determined by the throughput ratio of the gear train which is in turn determined by the back force applied to the control rotor by the variable compression band brake. In this case the slippage between the band brake and the control rotor results in a loss of power as heat; however, the implementation is straight forward, and the goal is to use this option for high starting torque to widen the operational torque speed envelope of the machine for getting heavy loads up to speed. The motion of the control rotor may also be controlled by a magneto-rheological fluid coupling placed around the control rotor or driving the control rotor by a hypoid worm gear drive arrangement that is connected to a small control motor.

In a more complex operational case the device is set up as a double rotor machine where both rotors are propelled by the motor action by sets of their own individual electromagnetic poles and stators. The main rotor is the rotor where the motive mechanical power is derived, and the secondary rotor is the gear-ratio control rotor. The rotors can aid each other forward or reverse; or they can buck each other forward or reverse. In the bucking situation, the electrical energy derived from the control rotor is recycled back to the main power bus of the system. It should be noted that some designs may require high back torque on the control rotor and in this case the rotor (which is also an element of one section of the epicyclic gear train) may be fashioned to be the sun gear of a compound epicyclic element with the ring gear of the compound arrangement ultimately serving as the control rotor.

In summary, the variable torque amplifier embodiment of the invention provides a compact way to greatly increase the starting torque of a traction motor means of applying either; 1) a back torque from a slipping-brake to the control rotor of the machine, 2) a back torque generated by a magneto-rheologic coupling placed around the control rotor of the machine, 3) an electromagnetically induced back torque to the control rotor, or 4) a back torque from a small auxiliary control motor.

FIG. 8 is a Mechanical Schematic Embodiment of an Electric Version of a Multi-Rotor High-Torque Wheel Hub Motor. The embodiment shown in FIG. 8 is built from a single Speed Torque Module 1, 2, 3, 3, 4, 5, 6, 7, 8, 9, and 15, and has the addition of bearing block 47, and bearing block 49. Stator set 4 and stator set 7 are rigidly mounted to a framework (not shown). Not shown (for clarity) is the lumped parameter control system (control system 41, 42 is shown in FIG. 7, as well as control busses 46, 47). The rotary action of rotor 5 (imparted by the electromagnetic interaction of pole-set 6 and stator-set 7) causes the planet gears 9 to rotate via axles 15 thereby driving dependent rotor 2. The electromagnetic interaction of pole-set 3 and stator-set 4 (as commanded by the lumped parameter control system 41 in FIG. 7) sets up a variable back torque on rotor 2 which allows rotor 2 to controllably slip and performs a speed-slip torque multiplication to the torque produced by independent rotor 5. The counteraction of rotors 5 and 2 (coupled through epi-cyclic gear train 8, 9, 2, 15, 5) amplifies the torque produced by independent rotor 5. The slip energy is realized through the electromagnetic interaction of pole-set 3 and stator set 4 is recycled through the lumped parameter control system 41 (FIG. 7) and directed back to the prime electrical power source. This embodiment is essentially an electric torque-converter that allows extremely high starting torque from a set of small motor rotors. This embodiment can be applied as a wheel-hub motor were high starting torques are necessary such as in mining, earth-moving equipment, and locomotives.

FIG. 9 is a Mechanical Schematic Embodiment of an Electric Version of a Multi-Rotor Band-Brake Style High-Torque Wheel Hub Motor. The embodiment shown in FIG. 9 is essentially built from a single Speed Torque Module 1, 5, 6, 7, 8, 9, and 15, and has the addition of bearing block 47, and bearing block 49. Referring to FIG. 8, the pole set 3 and stator set 4 have been replaced in FIG. 9 by the band brake assembly comprised of brake rotor 45, brake pad 46, brake band 47, and brake actuator 51. Stator set 7 is rigidly mounted to a framework (not shown). Not shown (for clarity) is the lumped parameter control system (control system 41, 42 is shown in FIG. 7, as well as control busses 46, 47). The rotary action of rotor 5 (imparted by the electromagnetic interaction of pole-set 6 and stator-set 7) causes the planet gears 9 to rotate via axles 15 thereby driving dependent rotor 2. The mechanical interaction of brake rotor 45, brake pad 46, brake band 47, and brake actuator 51 (as commanded by the lumped parameter control system 41 in FIG. 7) sets up a variable back torque on rotor 2 which allows rotor 2 to controllably slip and performs a speed-slip torque multiplication to the torque produced by independent rotor 5. For design simplicity, the slip energy as realized through the mechanical interaction of brake rotor 45, brake pad 46, brake band 47, and brake actuator 51 is dissipated as waste heat through the band brake assembly 45, 46, 47, and 51. This embodiment is basically an electromechanical torque-converter amplifier that allows extremely high starting torque from a set of small motor rotors. This embodiment finds application as a wheel-hub motor were high starting torques are necessary such as in mining, earth-moving equipment, and locomotives.

The band brake in FIGS. 9 (45, 46, 47 and 51) is not part of a motor or a stator as found in the Randall patent. The band brake in FIG. 9 replaces a motor (and/or stator) and functions to increase torque by allowing an epicyclic gear element to slip during periods when high torque is needed, rather than forcing the element to stop as in the Randall patent.

Figure 10:
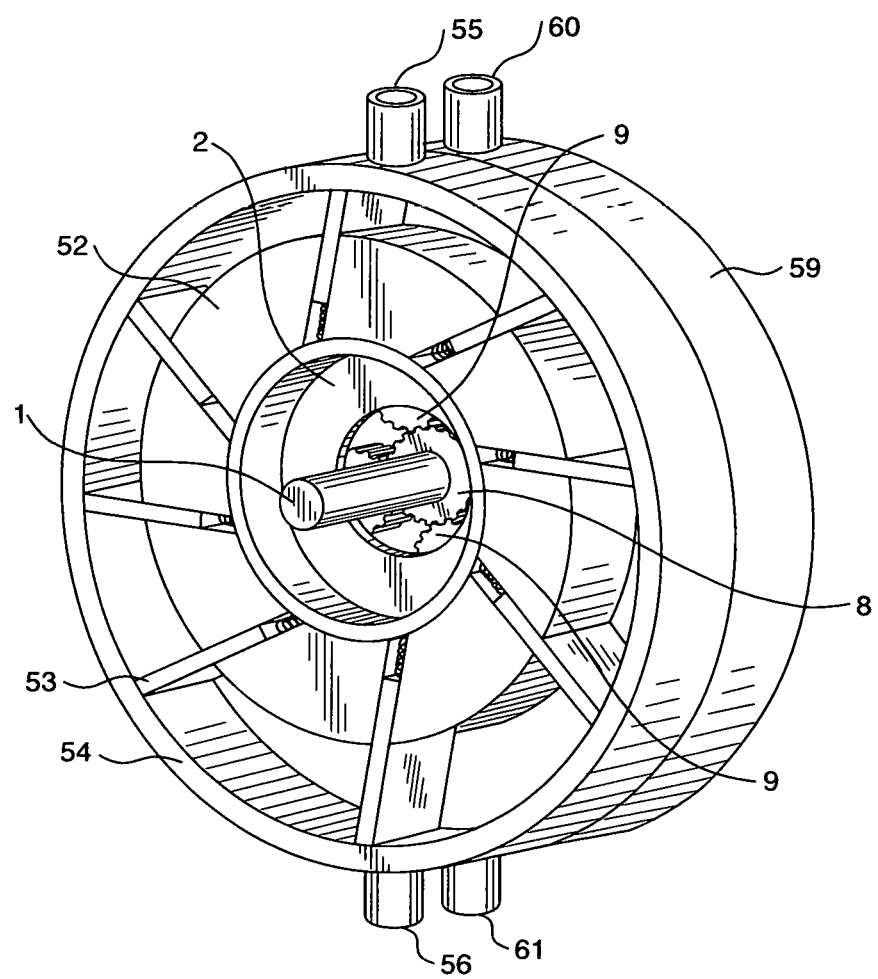
FIG. 10 is a Perspective View of Universal Fluid-Power Embodiment.
Figure 11:
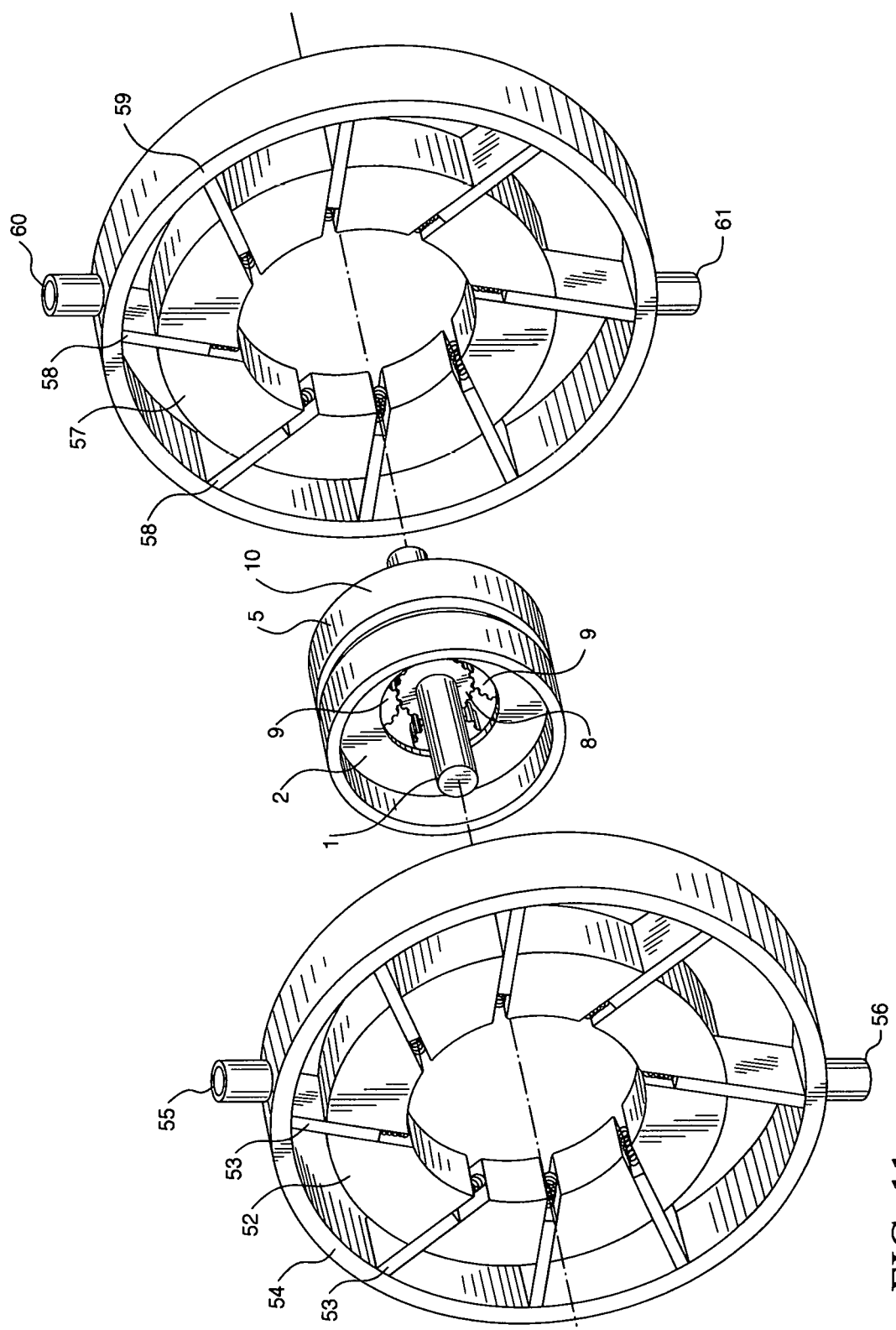
FIG. 11 is a Partially Exploded View of the Universal Fluid-Power Embodiment.

FIGS. 10 and 11—Additional Embodiment—Fluid-Power Universal Machine

The previously described embodiments of the universal machine describe applications where the speed/torque output of the primary propulsion rotor(s) are modulated by power sourcing/sinking secondary rotor(s), and the epicyclic gearing that the primary and secondary rotors share in common. The previously described embodiments describe systems where the primary rotor(s) are electrically actuated, and the secondary rotor(s) are either electrically actuated or consist of simple mechanical fixtures that supply drag by means of frictional brakes. In this embodiment, the primary and secondary rotors of the universal machine are connected to a positive displacement or centrifugal fluid-powered pump/compressor assembly. In the same manner, all of the previous embodiments of the universal machine can be adapted to have the primary and secondary rotors receive power, or supply power, to the power source/sink by means of a fluid-power. The fluid can be a liquid or a gas. In the case of the working fluid being a liquid, the preferred embodiment would be for the primary and secondary rotors to be actuated via a positive displacement motor/pump. In the case of the working fluid being a gas, the preferred embodiment would be for the primary and secondary rotors to be actuated via a centrifugal motor/pump. FIGS. 10 and 11 show the universal machine in the preferred condition for liquid actuation, and therefore display rotor actuation via a positive displacement vane style motor/pump.

FIG. 10 shows a Universal Fluid-Powered embodiment of the Multisection Speed/Torque Compensating Electro-Mechanical Energy-Conversion device. Mechanical coupling shaft 1 is shown proceeding through the hollow annulus in the drive plate portion of independent rotor 2, and connected to sun gear 8, whose gear teeth mesh with the gear teeth of plant gears 9. The integral fluid-power drive/driven motor/pump consisting of housing 54, vane block 52, vanes 53, and fluid bidirectional fluid-inlet/fluid-outlet ports 55, 56 are shown. Dependent motor/pump housing 59 is shown along with its bidirectional fluid-inlet/fluid-outlet ports 60, 61.

In FIG. 11 a partially exploded view of the Universal Fluid-Powered embodiment is shown in FIG. 10. Shaft 1 is shown proceeding through the hollow annulus in the drive plate of independent rotor 2 and connects to sun gear 8. Independent rotor 2 is surrounded by (and press fitted or solidly affixed to) fluid-power motor/pump 52, 53, 54, 55, and 56 when assembled. The gear teeth of planet gears 9 mesh with the gear teeth of sun gear 8 and the internal toothed annuls of dependent rotor 5. Planet gears 9 are held in place by shafts which are affixed to the drive plate portion of independent rotor 2. Independent rotor 2 turns about its center axis by the epicyclic kinematics of planetary gears 9 and their associated shafts. Dependent rotor 5 and its fluid-power motor/pump 57, 58, 60,61 are shown.

CONCLUSION, RAMIFICATION, AND SCOPE

The Multisection Speed/Torque Compensating Electro-Mechanical Energy-Conversion Device is universal electromechanical energy conversion device that can seamlessly transform power between the mechanical and electrical domains while automatically reconciling the speed/torque profiles of one or more rotational mechanical power loads or rotational mechanical power sources. The continuously variable gear ratios permitted by the invention allow all mechanical, electromechanical, and control-system elements to be optimally sized; thereby, limiting losses to maximum practical amounts to conserve energy and manufacturing cost. The invention can provide a continuously variable gear ratio without the need for fluid couplings, mechanical braking elements, or belts, all of which give rise to mechanical losses and generate waste heat.

The invention will have a positive impact on the wind-energy industry especially when the site is combined with a natural gas source; the invention allows a wind-powered electrical generation installation to always generate rated capacity by seamlessly augmenting any lulls in the available wind energy with clean burning natural gas within the same footprint of the canopy of the wind turbine, allowing power generation companies to reduce the size of their standby fossil fuel (e.g., coal, burning plant capacity), and also creating a more distributed electrical grid, as opposed to a centralized grid; thereby, adding immunity to the grid from natural disaster, or an intentional attack. The invention may also incorporate an overrunning clutch to providing a safety function in very high wind applications where windmill blades are feathered to provide no turbine-blade motion for the safety of both the wind turbine blades and the vertical mast of the windmill.

Although the description the invention contains many specificities, these should not be construed as limiting the embodiments but as merely providing some illustrations of some of the several embodiments. Thus the scope of the embodiments should be determined by the appended claims and their legal equivalents, rather than by the examples given.

I claim:

1. A machine comprised of at least one speed torque module, each module having:
   A. An epicyclic gear set comprising a first, second and third member;

B. At least a first shaft which is connected to at least one external mechanical power means, said first shaft fixedly connected to the first epicyclic member;
C. At least one primary rotor fixedly connected to the second epicyclic member;
D. At least one secondary rotor, fixedly connected to the third epicyclic member;
E. Said epicyclic gearset allowing the at least one primary rotor and the at least one secondary rotor to operate in an additive-mode or a differential mode;
F. A lockable over-running clutch located between the third epicyclic member and an output shaft, wherein said over-running clutch is the only means of torque transfer from the epicyclic gear set and said output shaft;
G. A control system to manage a speed torque profile of the at least one primary rotor and the at least one secondary rotor by sourcing, sinking, or dissipating said power of said rotors to thereby affect a transfer ratio between the at least one external power means to said machine.

2. The machine set forth in claim 1 wherein there are two said external mechanical power sources of disparate speed torque profile, fixedly coupled to a plurality of input/output shafts of said speed torque module to balance the mechanical powers to generate electrical power.

3. The machine as set forth in claim 1 wherein a source of motive power is electrically coupled with an external rotary mechanical source and the input and output shafts are coupled to drive wheels.

4. The machine as set forth in claim 1 wherein a source of power is electrical or regenerative and wherein a single universal mechanical input-output shaft is coupled to at least one of external rotational mechanical load or external rotational mechanical power source.

5. The electromechanical machine set forth in claim 1 wherein said control system can adjust to variable sources of power and loads to convert at least one rotating mechanical-power source to at least one rotating mechanical-power output via a shaft shared by epicyclic gears adapted to at least one input/output module wherein each such module is connected to at least one other like electromechanical machine.

6. The machine as set forth in claim 1 wherein the over-running clutch limits the output shaft from at least one speed torque module from transmitting mechanical power to any non-operating mechanical power means.

7. The machine of claim 1 wherein the control system is connected to a bidirectional electrical source of power to manage the speed torque profile of at least one rotor of the at least one speed torque module and an external mechanical power means fixedly connected to at least one rotor, and at least one output shaft fixedly connected to an external power means.

8. The machine of claim 1 wherein the control system manages a speed differential of the primary and secondary rotors of the at least one speed torque module to control the speed and torque of the second and third epicyclic members in both directions.

9. The machine of claim 1 wherein at least one of the rotors of the at least one speed torque module is actuated by fluid-power means.

* * * * *